United States Patent [19]
Hirose et al.

[11] Patent Number: 6,084,554
[45] Date of Patent: Jul. 4, 2000

[54] APPARATUS FOR RECORDING IMAGE DATA IN ACCORDANCE WITH A USAGE CONDITION OF COLORANT DEPOSITING MEANS

[75] Inventors: Masayuki Hirose, Kawasaki; Fumio Mikami, Hachiohji, both of Japan

[73] Assignee: Canon Kabushiki Kaisha, Tokyo, Japan

[21] Appl. No.: 08/289,571

[22] Filed: Aug. 12, 1994

Related U.S. Application Data

[62] Division of application No. 08/120,325, Sep. 14, 1993, Pat. No. 5,357,347, which is a continuation of application No. 07/942,330, Sep. 9, 1992, abandoned, which is a continuation of application No. 07/513,687, Apr. 24, 1990, abandoned.

[30] Foreign Application Priority Data

| Apr. 25, 1989 | [JP] | Japan | 64-106714 |
| Apr. 25, 1989 | [JP] | Japan | 64-106715 |
| Apr. 25, 1989 | [JP] | Japan | 64-106716 |

[51] Int. Cl.[7] ............................................. B41J 2/175
[52] U.S. Cl. .................................. 345/5; 347/3; 358/296
[58] Field of Search ............................. 358/75, 406, 404, 358/296; 346/140; 347/7, 3, 43, 5

[56] References Cited

U.S. PATENT DOCUMENTS

| 4,521,805 | 6/1985 | Ayata et al. ................................ 347/43 |
| 4,707,713 | 11/1987 | Ayata et al. ............................... 346/140 |
| 4,739,397 | 4/1988 | Hayashi ..................................... 358/80 |
| 5,132,711 | 7/1992 | Shinada et al. |
| 5,353,387 | 10/1994 | Petschik et al. ........................... 347/43 |
| 5,406,392 | 4/1995 | Aoki et al. ................................. 347/43 |

FOREIGN PATENT DOCUMENTS

| 54-84744 | 7/1979 | Japan . |
| 55-138140 | 10/1980 | Japan . |
| 60-53964 | 3/1985 | Japan . |
| 61-61182 | 3/1986 | Japan . |
| 62-19257 | 2/1987 | Japan . |
| 63-64120 | 3/1988 | Japan . |
| 63194475 | 11/1988 | Japan . |
| 64-16660 | 1/1989 | Japan . |

*Primary Examiner*—John Barlow
*Assistant Examiner*—Christina Annick
*Attorney, Agent, or Firm*—Fitzpatrick, Cella, Harper & Scinto

[57] ABSTRACT

A communication apparatus having a recording device operable in a first recording mode for effecting a multi- or full-color recording in response to image signals received and a second recording mode for effecting monochromatic recording in accordance with image signals received; a discriminator for discriminating that the operation in one of the first and second recording modes becomes incapable, and a device for notifying a result of discrimination by said discriminating means to the image signal sending station which sends the image signals to be recorded.

8 Claims, 12 Drawing Sheets

APPARATUS FOR RECORDING IMAGE DATA IN ACCORDANCE WITH A USAGE CONDITION OF COLORANT DEPOSITING MEANS

This application is a division of application Ser. No. 08/120,325 filed on Sep. 14, 1993 now U.S. Pat. No. 5,357,347, which is a continuation application of a continuation application of Ser. No. 07/942,330 filed on Sep. 9, 1992 now abandoned, which is a continuation application of Ser. No. 07/513,687 filed on Apr. 24, 1990 now abandoned.

FIELD OF THE INVENTION AND RELATED ART

The present invention relates to an image communication apparatus for effecting recording on a recording medium such as a sheet which is located at a remote position, with recording material such as ink.

A conventional image communication apparatus of this kind is operable selectively in a so-called remote mode wherein the recording operation is performed at a position remote from the operator and a so-called local mode wherein the recording operation is performed in a recording station which is operated by the operator. More particularly, the former mode, the record informaton sent by the operator is received by another station which is remote; and in the latter mode, the operator can watch the recording operation and the result thereof.

This apparatus involves a problem that even if the sending station which sends the read image to a receiving station instructs color image recording, the good recording operation can not be continued if the recording material such as chromatic ink or black ink is used up in the receiving station.

In the conventional apparatus, it has been difficult to correctly detect the lack of the recording material such as ink, and therefore, in order to prevent the continuance of the recording operation without the recording material, the short of the ink in which a slight amount of the ink still remains is discriminated, and the event is displayed, for example.

However, in the local mode, the operator is often present in the neighborhood of the apparatus, and therefore, the prohibition of the recording in response to the above discrimination prevents the remaining recording material from being consumed efficiently.

In the remote mode, the operator is often (far) away from the apparatus, and therefore, it is important to automatically prevent the incomplete recording irrespective of the presence or absence of the operator in the neighborhood of the information receiving apparatus.

In the conventional example, the good recording operation can not be continued if the recording material such as chromatic color ink or black ink is used up, even if the sending station instructs the color image recording.

SUMMARY OF THE INVENTION

Accordingly, it is a principal object of the present invention to provide a communication apparatus in which the good communication can be continued even if the receiving station becomes short of the recording material such as ink.

According to an embodiment of the present invention, there is provided a communication apparatus comprising recording means operable in a first recording mode for color image recording in accordance with the received image signals and in a second recording mode for monochromatic recording, means for discriminating that the recording operation in one of the first and second recording mode becomes not possible, and means for transmitting a signal indicative of an output of said discriminating means.

It is another object of the present invention to provide a communication apparatus which can continue the receiving and recording operation even when the receiving station becomes short of the recording material during the communication.

It is a further object of the present invention to provide an image recording apparatus which can efficiently use the recording material such as ink.

It is a further object of the present invention to provide a communication apparatus and an image recording apparatus having a novel function.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5, 6-1, 6-1A, 6-1B, 6-2 and 7 are flow charts illustrating operations of the machines shown in FIG. 1.

PREFERRED EMBODIMENT OF THE PRESENT INVENTION

In the following description, an image recording apparatus operable in the remote mode and the local mode is taken. However, the present invention is not limited to such an apparatus, but is applicable to an apparatus having a facsimile communication function, for example.

The preferred embodiment of the present invention will be described in conjunction with the accompanying drawings.

Figure 1:
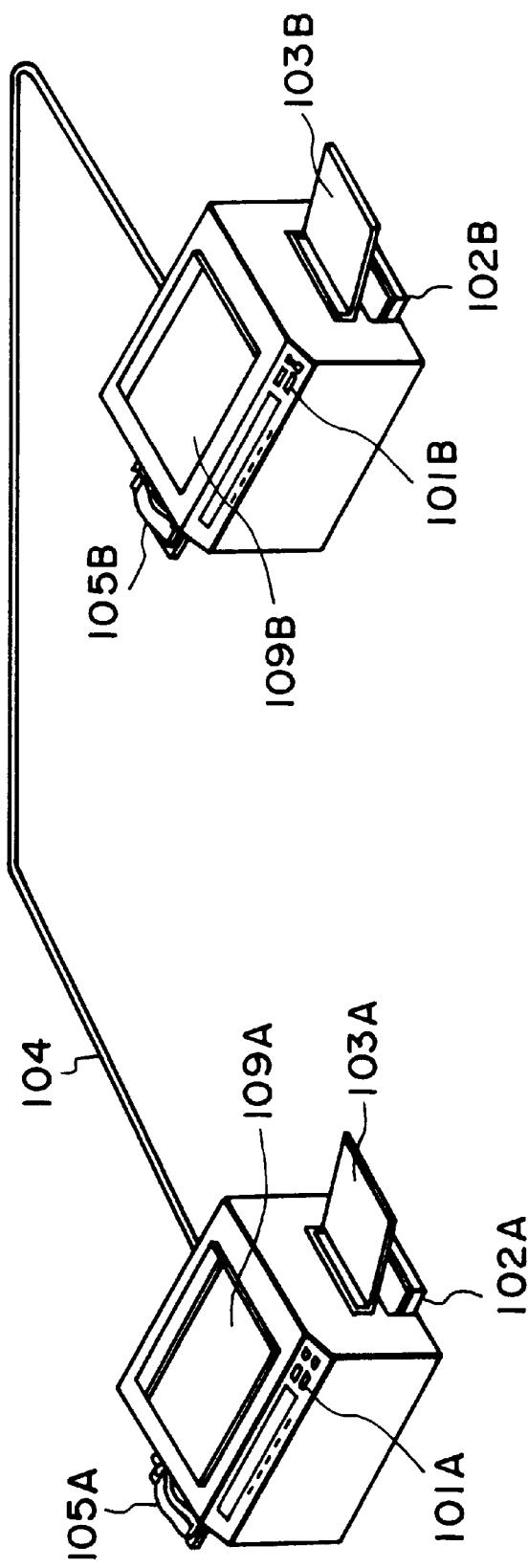
FIG. 1 shows the machines connected by wiring or the like, according to an embodiment of the present invention.
Figure 2:
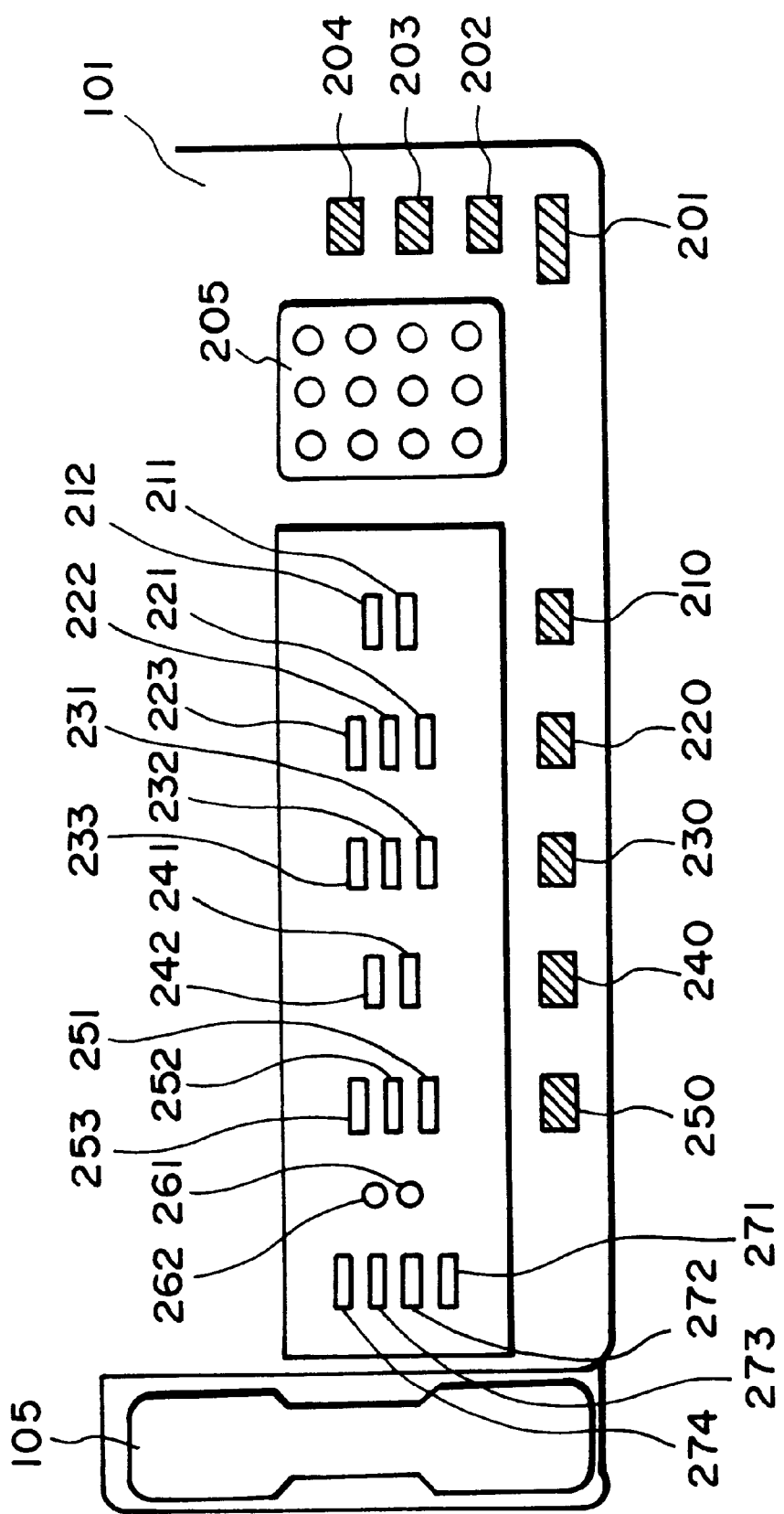
FIG. 2 shows an operating station of the apparatus of FIG. 1.
Figure 3:
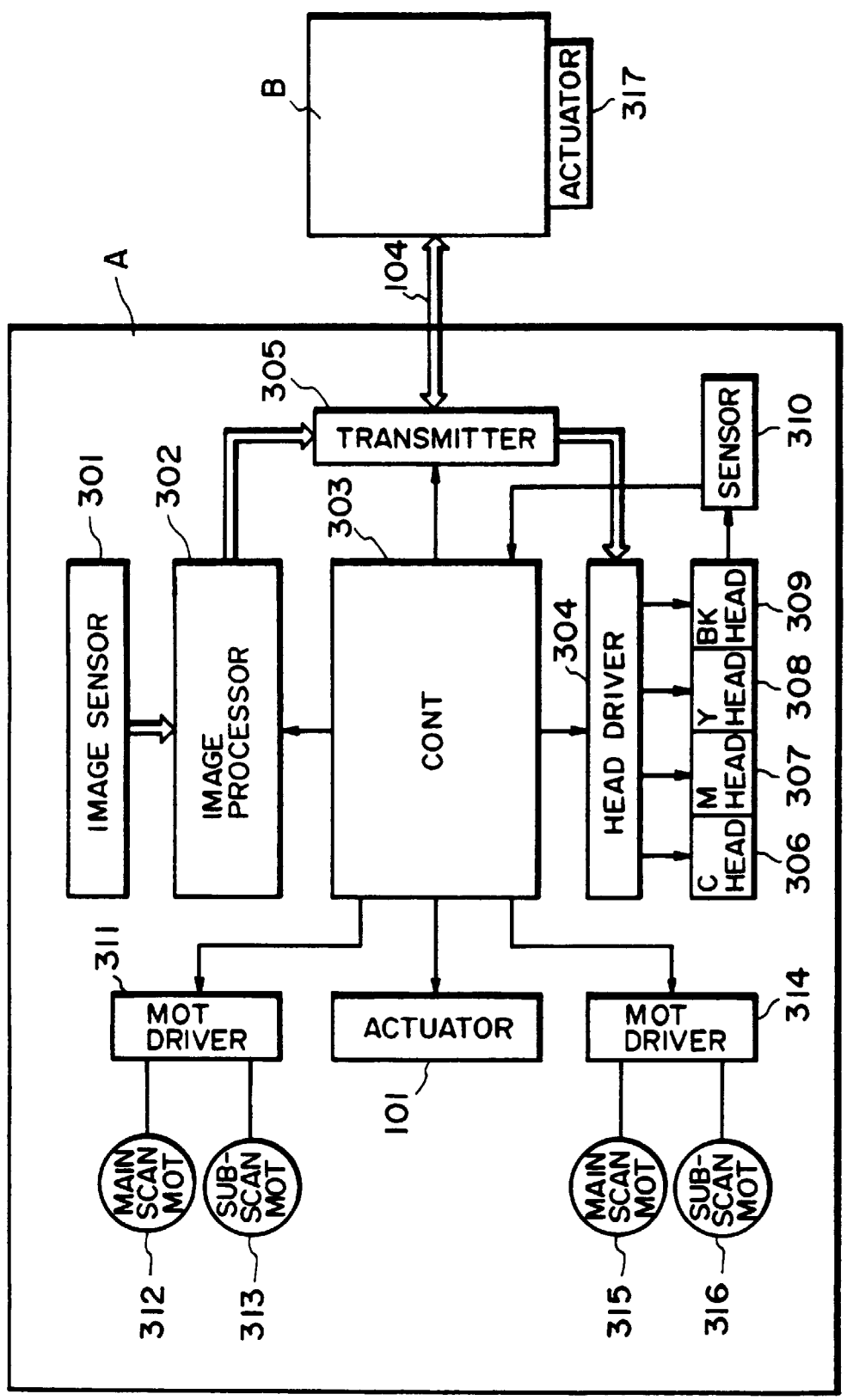
FIG. 3 is a block diagram of a circuit in the apparatus of FIG. 1.

FIGS. 1–3 illustrate an apparatus according to an embodiment of the present invention. In FIG. 1, two image recording machines are connected for communication.

The image recording machine includes an operating station 101, a cassette 102 for accommodating recording paper or sheets, a tray 103 for receiving the sheet after the recording. Designated by a reference numeral 104 is public wiring, cable for communicating the machines A and B electrically or optically to permit bidirectional communication. Designated by a reference numeral 105 is a telephone set connected with the public wiring.

In the following description, the references have "A" for the machine A, and "B" for the machine B. For example, the operating stations of the machines A and B are designated by 101A and 101B, respectively.

FIG. 2 shows details of the operating stations 101A or 101B.

The operating station comprises a start key for starting a copying operation or a sending operation, a stop key 202 for stopping the copying operation and the sending or receiving operation and a resetting key 203 for initializing the machine. It further comprises a cleaning key 204 for effecting the cleaning operation for the ink head which will be described in detail hereinafter, ten-keys 205 for dialing in the telephone function 105. Switches 210, 220, 230, 240 and 250 are associated with corresponding displays; displays 211 and 212 correspond to the switch 210, for example, and the associated display or displays are switched upon actuation of the switch. The switch 210 is for adjusting the image quality, more particularly, a sharp image or a soft image is selectable by the switch 210 changing the degree of edge enhancement. The display 211 displays the sharp image selected; and the display 212 displays the soft image selected. The key 220 is a magnification setting key. Upon each actuation of the key, the magnification set is changed. The displays 221, 222 and 223 display the selected magnification. The key 230 is for selecting the image density. In this embodiment, the density is selectable from "dark", "standard" and "light", which are displayed on the displays 231, 232 and 233, respectively, when selected. The key 240 is for selecting an image recording mode or a communication mode from a chromatic color mode, a monochromatic color mode (black and white mode, for example). The key 240 is associated with the displays 241 and 242 which displays the mode selected by the key 240, by emitting light from one of them, for example. The machines may be such that either one of them is automatically selected by the communication protocol, irrespective of the operation of the key 240. The key 250 is a selecting key for selecting one of the local mode, the remote mode and the telephone mode. The selection is displayed on the display 251, 252 or 253 in association with the key 250. A display 261 is for paper jam to produce an alarm when the recording paper is not conveyed or discharged in good order. The display 262 is for displaying the lack of the recording paper or sheet. The displays 271, 272, 273 and 274 are for notifying the operator of the lack or short of the ink, and they are provided for the four coloring inks. FIG. 3 is a block diagram of the machine of this embodiment. In FIG. 3, reference numeral 301 designates an image sensor for reading an original placed on an original supporting platen 109A which produces 8 bit image data for each of the red, green and blue color components. An image processor receives the data from the image sensor 301 and converts them to yellow, magenta, cyan and black data, and further, processes for half-tone reproduction of density memorizing type such as binary code type. A transmitter 305 functions to transmits the binary level signal from the processor 302 selectively to the machine B or to a head driver 304. The transmitters 305 in the machines A and B have the similar structures, and communicate with each other to transmit the state of one of the machines to the other. The state of the machine is supplied to the controller 303. The head driver 304 serves to drive the heads 306, 307, 308 and 309 in accordance with the signals from the transmitter 305. A sensor 310 is effective to discriminate whether the ink remains in each of the heads 306–309. The sensor is effective to output the ink remaining amount of each of the heads, separately. The machine is provided with a motor driver 311 for driving a main scan motor 312 and a subordinate scan motor 313 for scanningly moving the image sensor 301 relative to the original in the main scan direction and the subordinate scan direction, respectively, and a motor driver 314 for driving a main scan motor 315 and a subordinate scan motor 316 for scanningly moving a carriage carrying the heads 306–309 relative to the recording medium such as the paper in the main scan and subordinate scan directions, respectively. The motor drivers 314 and 315 are timing-controlled by the controller 303.

Figure 4:
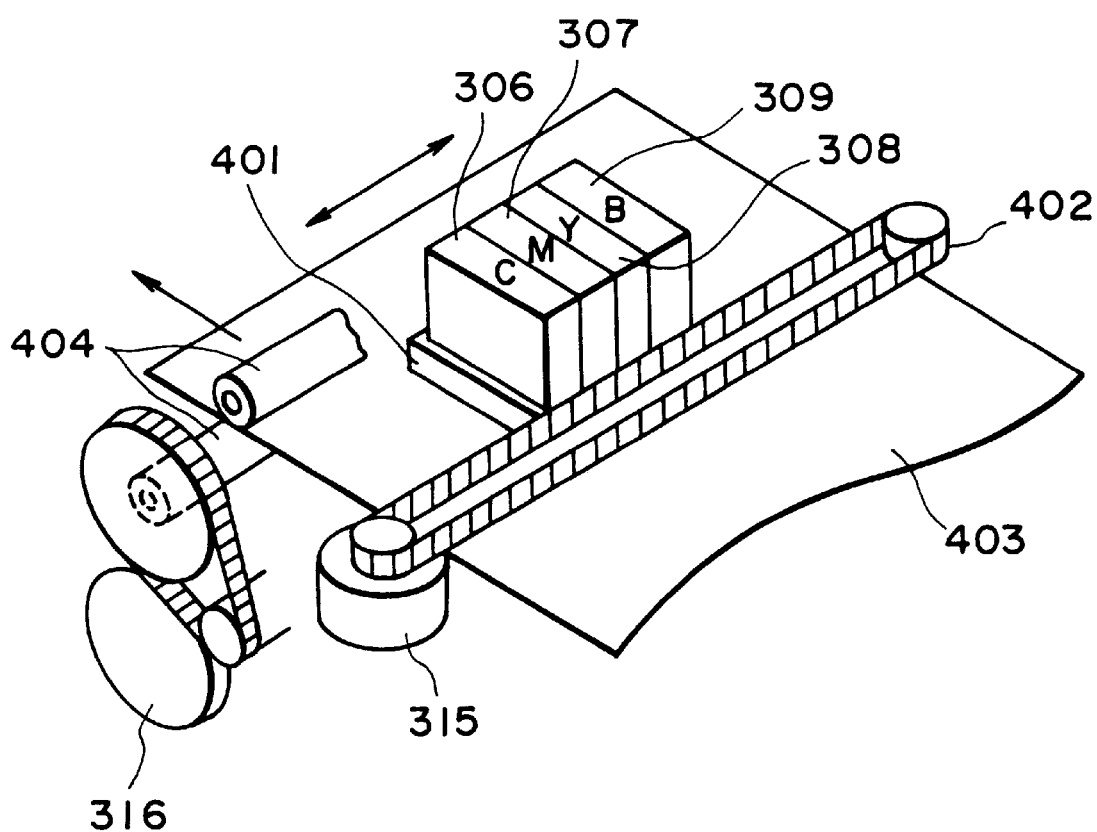
FIG. 4 shows the structure around a recording head of the apparatus of FIG. 1.

Referring to FIG. 4, the description will be made as to the structure around the heads 306–309.

FIG. 4 is a perspective view showing the arrangements of the recording heads 306–309, the main scan motor 315 and the subordinate scan motor 316. The heads 306–309 are supported on the carriage 401, which in turn is moved by a belt 402. The belt 402 is driven by the main scan motor 315. A sheet feeding roller 404 functions to feed the recording medium 403 and is controlled and rotated by the subordinate scanning motor 316.

Figure 9:
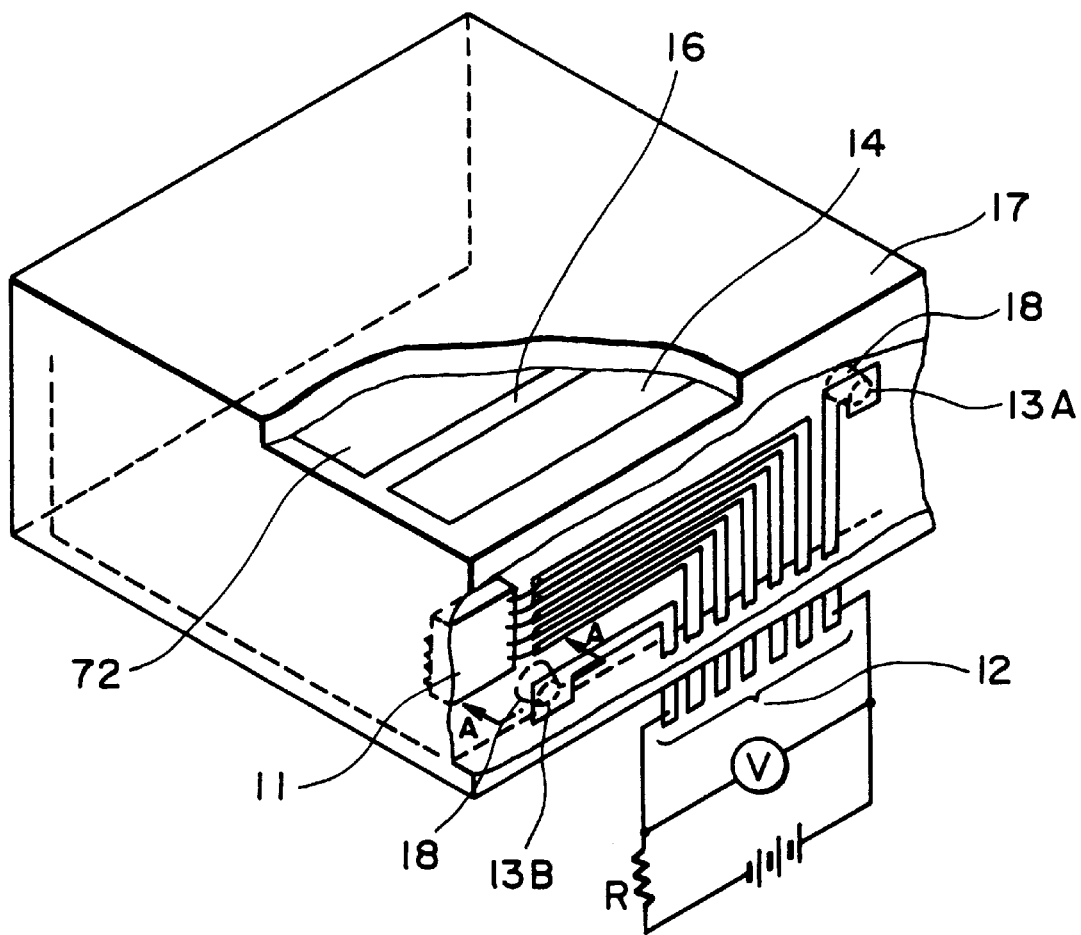
FIGS. 9–12 illustrate an example of a sensor used in the apparatus of FIG. 1.
Figure 10:
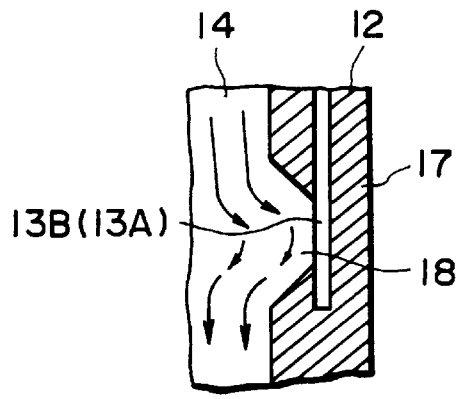

Referring to FIG. 9, the description will be made as to the sensor 310 shown in FIG. 3. FIG. 9 shows the internal structure of the sensor 310 together with one of the heads. The recording head has an ink ejecting portion having a function of ejecting the ink, a lead frame 12 comprising conductor plates for electric connection between the ink ejecting portion 11 and the ink ejection recording head by way of wire-bonded portions, electrodes 13A and 13B formed together with the lead frame 12 as shown in FIG. 10 to detect a remaining amount of the ink, which will be described in detail hereinafter, an ink passage for supplying ink from an ink container 2 to the ink ejecting portion, and a partition wall 16 between the ink container 2 and the ink passage 14.

Figure 11:
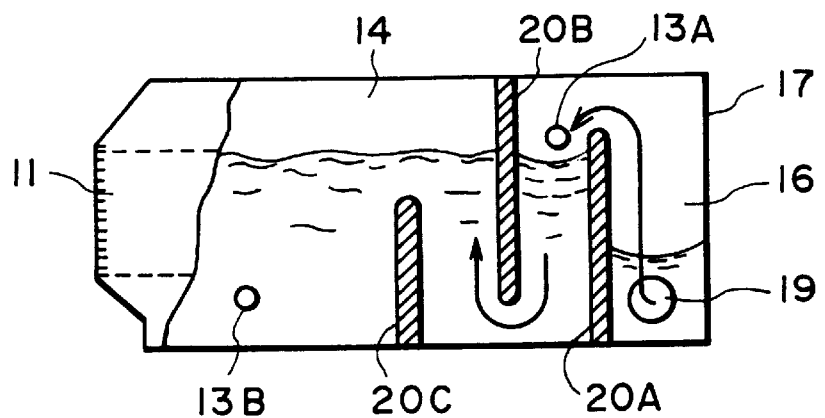

The lead frame 12 is embedded in a casing 17 made of resin material, for example, of a unit constituted by integral ink container 2 and the ink ejecting portion 11. Only the ink remaining amount detecting electrodes 13A and 13B are exposed to the ink passage 14 through conduits 18. The electrodes are connected with a power source through a resistor R. As shown in FIG. 11, the ink passage 14 is provided with an ink inlet port 19 formed in the partition 16 and is also provided with alternate ribs 20A, 20B and 20C, extending alternately from the top wall and the bottom wall.

The ink introduced into the passage 14 through the ink supply port 19 from the ink container 2 is supplied to the next section beyond the first rib 20A by an unshown capirally tube, and is further supplied to the ink ejecting portion 11 the way indicated by arrows. The ink is then ejected by the ejecting portion 11 during the recording operation and the returning movement of the head. When the ink container 2 becomes empty with the result that the ink supply passage 14 is not supplied with the ink, the surface of the ink becomes as shown in FIG. 11, more particularly, the ink remaining amount detecting electrode 13A is exposed above the ink surface, so that the electric connection between the detecting electrodes 13A and 13B is broken.

Figure 12:
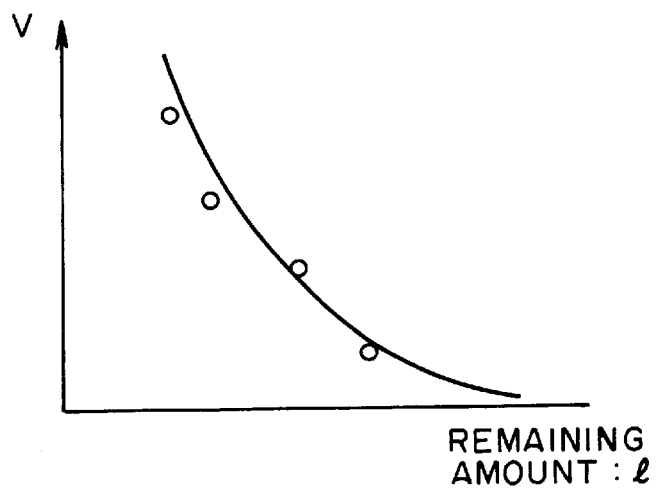

Thus, the event that the remaining amount of the ink reaches the limit can be detected by the stop of the electric current. Since the electric current flows, even if the rate thereof is small, as long as a thin layer of the conductive ink exists bridging the detecting electrodes, there is a relationship as shown in FIG. 12 between the voltage V and the remaining amount of the ink 1, when the detecting circuit is so constructed that a constant current flows. Therefore, it is possible to detect the remaining amount of the ink.

As regards the embedding of the lead frame 12 in the casing 17, it is preferably made by insert molding in order to prevent the leakage of the ink. In addition, the detecting electrode 13A and 13B are preferably plated with gold or made of stainless steel to provide sufficient resistivity to the ink. By constructing this way, it will suffice if a part of the lead frame 12 is exposed to the supply passage 14 without provision of the conventional detecting means or without connecting leads to the detecting electrodes. The correct and reliable detection is possible for the remainder of the ink.

The ink remainder detecting mechanism shown in FIG. 9 is provided in each of the recording heads 306–309, as the sensor 310 shown in FIG. 3. Therefore, the sensor 310 can carry out the detection for each of the heads separately.

The operation of the apparatus will be described referring to FIGS. 3 and 5 mainly. The operator places an original to be recorded on an unshown original platen. When the operator depresses the start key 201, the apparatus is first initialized (S1). Then, the original is scanned for the image exposure by an unshown optical system (S3). The scanning drive is accomplished by the motor driver 311 responsive to the controller 303 rotating the main scan motor 312 at a predetermined speed. The image sensor 301 receives the reflected light from the original, and the reflection density data of the original color-separated by red, blue and green filters are sequentially supplied to the image processor 302 at the predetermined timing. The image processor converts the analog signal from the image sensor 301 into digital data, which are processed in a predetermined manner to be converted to signals suitable for the ink head driving which will be described hereinafter, and thereafter, the signals are sent to the transmitter 305.

When the local mode is selected by the switch 250 at the operating station 101, the operation proceeds from step S7 to step S9, wherein the signals are supplied to the head driver of its own apparatus A through the signal selection by the transmitter 305, and the recording operation is effected at step S9.

The head driver 304 supplies the drive signals at proper recording timing to each of four color heads, i.e., cyan head 306, magenta head 307, yellow head 308 and black head 309. The heads 306–309 are supported on the carriage 401, as shown in FIG. 4. Under the state of FIG. 4, the rotational driving force of the main scan motor 315 is transmitted to the carriage by the belt 402. In synchronism with the driving of the main scan motor 315 during the reading operation, the carriage is moved in the main scan direction.

Upon completion of recording on one scanning line from one lateral end to the opposite lateral end of the recording medium (recording paper) 403, the main scan motor 315 moves the carriage 401 to the record starting position. In addition, the subordinate scan motor 316 is actuated to rotate the paper feeding roller 404 to feed the recording paper 403 through a predetermined distance. Then, the main scan is started again, and the recording operation is performed in the recording width. By repeating the above operations, the recording is effected on the entire surface of the recording sheet 403. Upon completion, the recording sheet is discharged to a discharge tray, so that the recording operation ends (S13).

It is added here that at step S17 which will hereinafter be described, the recording operation may be continued, not prohibited. Even if it is detected that the remaining amount of the ink is small, there still remains a small amount of ink in many cases. Particularly in the local mode including the step S17, the operator is in many cases around the apparatus. By continuing the recording operation at step S17, the remaining amount of the ink can be efficiently consumed.

During the recording operation described above, the remaining amount of the ink is detected at step S11 by detecting means shown in FIG. 9, for example, and the lack of the ink is notified to the controller 303 by the sensor 310.

The controller 303 makes the display in the first display mode corresponding to one of the displays indicative of the lack of the ink for the ink among the displays 271, 272, 273 and 274 corresponding to the kinds of the inks. In this embodiment, for example, the display is a flickering display having the on-state for 0.2 sec and the off-state for 0.8 sec (S15). The display may be immediately after the detection, or it may be detected after a predetermined operation is completed; for example, it may be displayed after completion of the image recording on one page. After the warning of the lack of the ink at step S15, the subsequent processing and operations are prohibited to prevent improper image recording attributable to the lack of the ink.

When the remote mode is selected by operation of the switch 250 on the operating station 101, and when the display 252 is on, the sequential operation proceeds from the step S7 to the step S19, where the transmitter 305 transmits the signal as the recording signal to the head driver of the apparatus B through a cable 104 and through the transmitter of the apparatus B, the apparatus B having the same structure as the apparatus B (S19).

Then, the same processing as in the focal mode is effected in the apparatus B so that the recording operation is performed by the apparatus B (S21). The remaining ink detection is similarly performed also in the apparatus B, and therefore, the lack of the ink is detected by the sensor and the controller of the apparatus B. If it occurs, the lack of the ink is displayed on the operating station 317 of the apparatus B to make the display in the second mode wherein it is flickered with on-state for 0.8 sec and the off-state for 0.2 sec. Simultaneously, the lack of the ink in the apparatus B is transmitted to the controller 303 of the apparatus A through the cable 104 functioning as the transmitting path (S23). Then, the same second mode display is made on the operating station 101 of the apparatus A. Thus, the display on the operating station 101 of the apparatus A is both for the display of the lack of the ink in the apparatus A and for that in the apparatus B. For the purpose of providing distinction between the two kinds of displays, the states of the display are made different. Therefore, the structure of the apparatus is simplified, and in addition, the state of the receiving apparatus can be discriminated on the sending and receiving apparatuses.

After the detection of the lack of the ink in the apparatus B in the remote mode, the subsequent processing, such as the color data transmission is stopped (S27), and thereafter, the discrimination is made by the controller 301 of the apparatus A as to whether or not the apparatus B is switched to the local mode from the remote mode (S29). The switching may be automatic by the controller 301, or may be executed by the operator using an unshown switch. In addition, the mode changing switch 250 may be used also for the switching. When the mode is switched automatically, the displays 251, 252 and 253 are switched, correspondingly.

After the mode is switched to the local mode, the sequential operation proceeds from the step S29 to the step S9 in which the above-described operation is continued until one of the ink materials is completely used up. In this case, the recording operation is continued with the "no-ink" displayed in the second mode so as to distinguish it from the "no-ink" in the normal local mode.

It is possible that the "no-ink" occurs during the switched local mode operation, at this time, the display is switched to the first mode display to display the "no-ink" in the normal local mode.

In this case, various processing operations during the recording operation are performed, and thereafter, the apparatus A displays "no-ink" to reject the subsequent recording operation.

Figure 5:
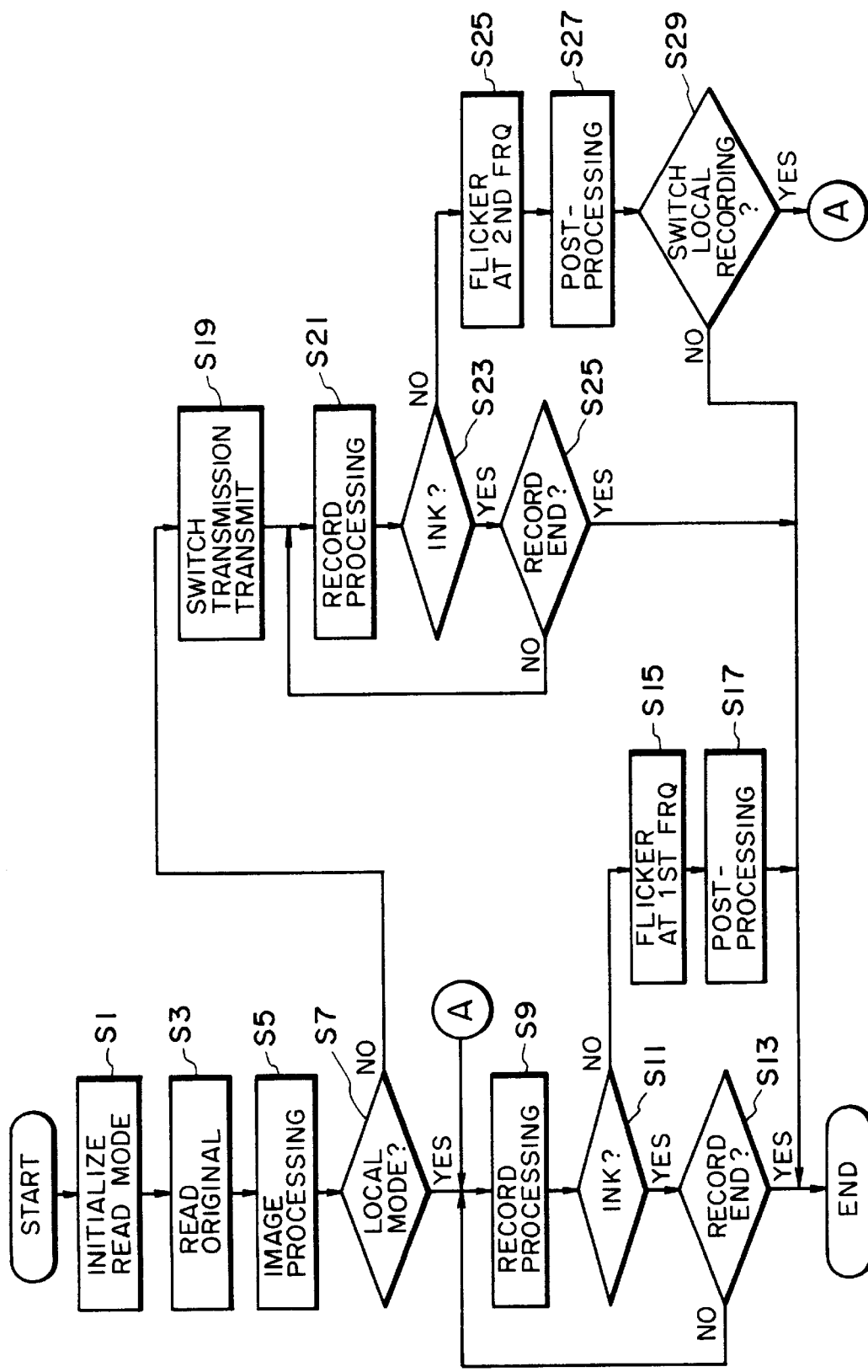

FIG. 5 is a flow chart illustrating the sequential operation of the apparatus described in the foregoing.

In this embodiment, in the local mode, when the apparatus A receives the no-ink signal from the apparatus B at step S23, the transmission of the image signals for the recording is prohibited, so that the erroneous image signal transmission to the disabled receiving side can be prevented.

As described in the foregoing, according to this embodiment, the "no-ink" of the remote recording station which is away from the operator so that the operator can not watch it, is displayed with a display mode which is distinguished from the normal "no-ink" of the apparatus A. Therefore, the information is assuredly transmitted to the operator, and in addition, if instructed, the subsequent recording can be continued in the local mode.

Figures 1A, 6:
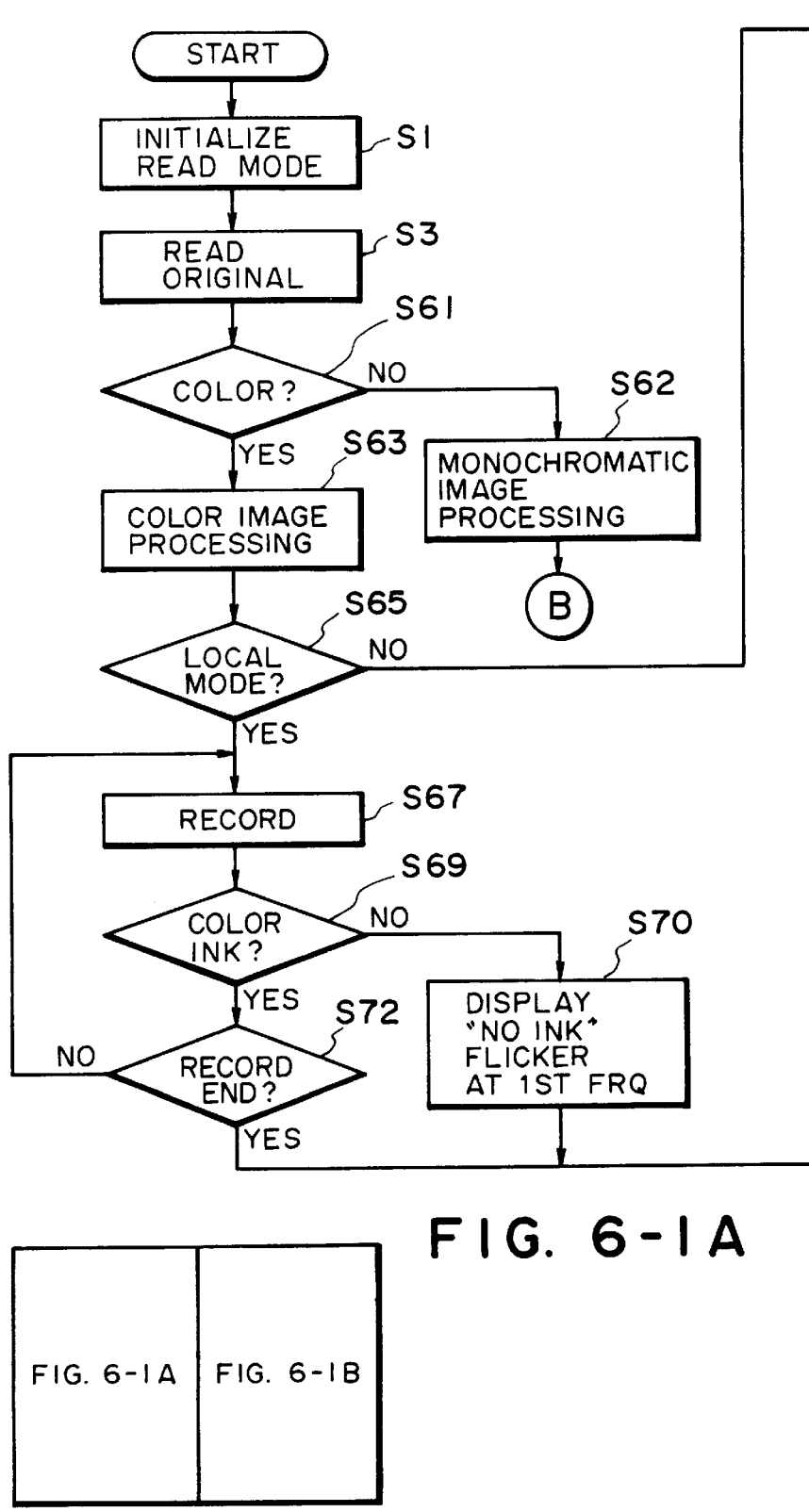
Figures 1, 6:
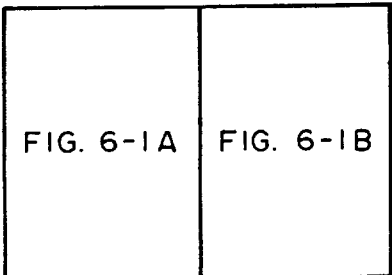
Figures 1B, 6:
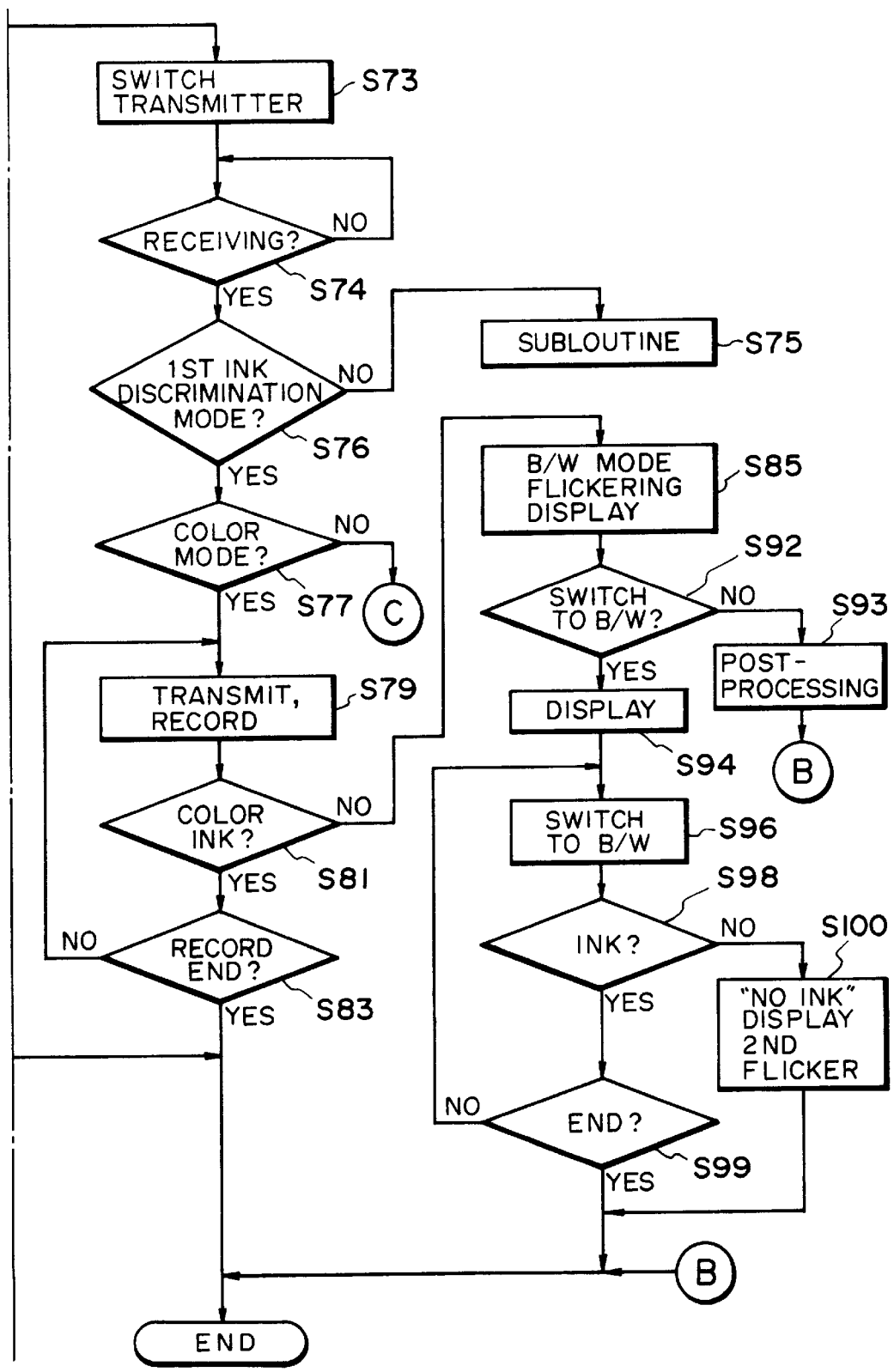
Figures 2, 6:
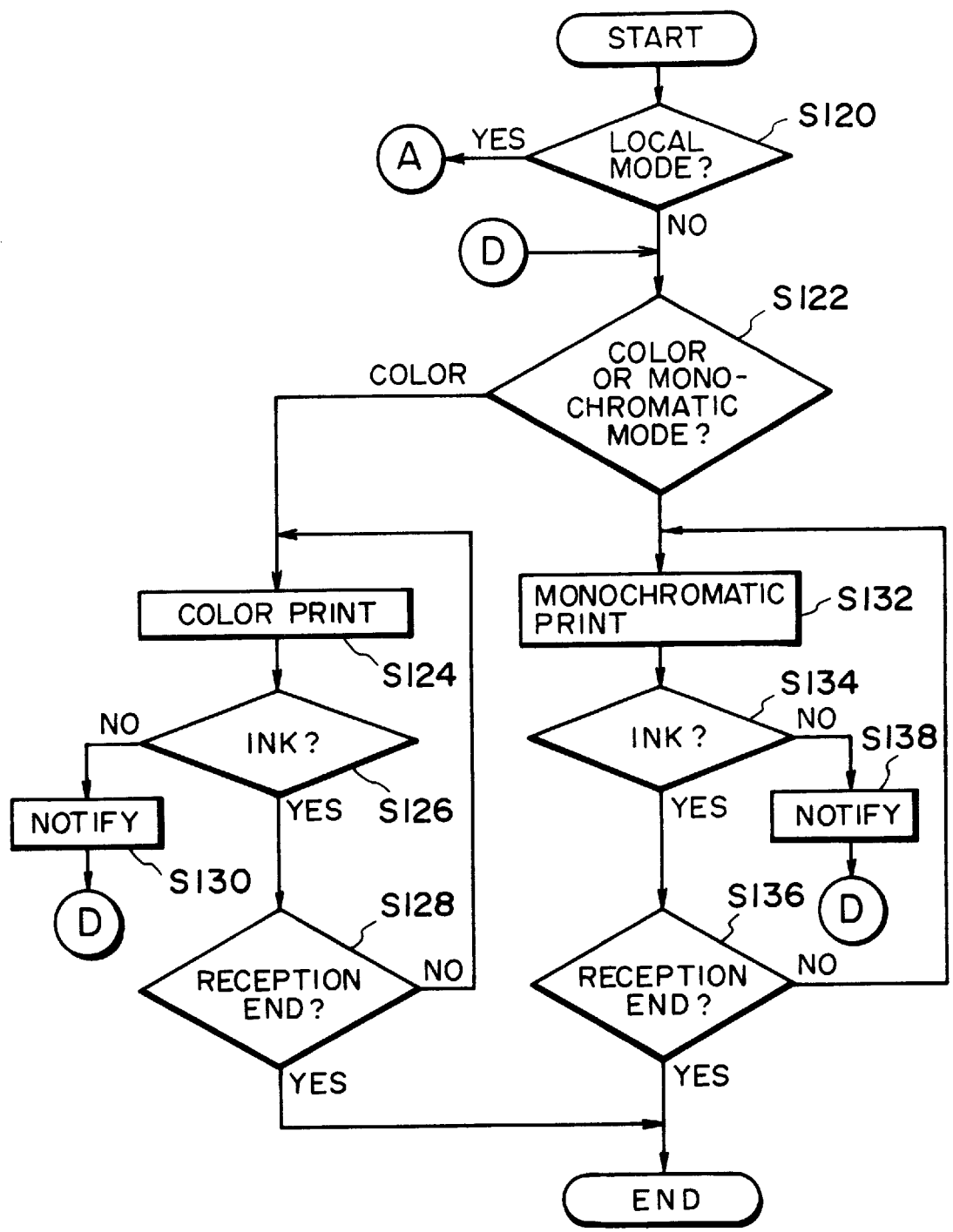

Referring to FIGS. 6-1 and 6-2, the operation of the apparatus according to another embodiment of the present invention will be described. FIGS. 6-1A and 6-1B are partial views of the flow charts with 6-1 showing full placement of the partial views.

FIGS. 6-1 and 6-2 are flow charts which are a modification of the foregoing embodiments. The steps S1 and S3 in FIG. 6-1 are similar to the steps S1 and S3 in FIG. 5, and therefore, the detailed description thereof is omitted. After the step S3, the discrimination is made at step S61 as to whether or not the color processing is selected by the switch 240, for example. If so, the image signal read by the sensor 301 is color-image-processed at step S63. If not, the image signal read by the sensor 301 is processed for the monochromatic (black and white, for example) recording (S62). In an example of such a processing, when the image signal from the sensor 301 contains a red component R, a green component G and a blue component B, it is deemed as a brightness signal Y (Y=0.3R+0.6G+0.1B). After the step S63, the discrimination is made as to whether or not the apparatus is in the local mode or not at step S65. If so (local mode), the full-color image printing operation is performed using all of the heads 306–309.

During the full-color printing operation, the remaining amount of the ink in each of the heads is detected by the sensor 310 (S69). When the sensor 310 detects the reduction of the ink remaining amount, the display indicative thereof is made (S70), and the printing operation is stopped, for example. In place of the stoppage, the printing operation can be performed with the other ink or inks even if the correct color ink is used up, by changing the image processing operation.

When the full-color printing is completed (for one page, for example) the sequential operation goes out of the step S72, so that the recording operation ends.

If the remaining amount of any one of the yellow ink, the magenta ink, the cyan ink, at step S69, the recording can be continued using the black ink only (an example of another ink) at step S70.

The apparatus may be so constructed that whether such a processing is performed manually or not can be selected manually. When the operation is switched to the black ink operation, the driving conditions of the head may be changed to match the recording head and the properties of the black ink.

If it is discriminated at step S65 that the local mode is not selected by the mode selector key 250, and the remote mode is selected, the transmitter 305 of the apparatus A is controlled so as to transmit the image signal to the transmitter 305 of the apparatus B through the transmission path 104 (S73). Then, the apparatus A waits for reception of a signal indicative of permission of reception from the transmitter 305 of the apparatus B (S74). From the apparatus B, one of the following five mode signals on the basis of the ink remaining amount detection for each of the ink heads in the apparatus B: the five mode signals include a first mode in which amounts of remaining yellow ink, magenta ink, cyan ink and black ink are sufficient, and therefore, the image signal reception is possible in either the color mode or the monochromatic mode; a second mode wherein the remaining amount of the black ink is sufficient, but at least one of the yellow ink, magenta ink and cyan ink is not sufficient, and therefore, only the monochromatic mode reception is possible; a third mode wherein the black ink is used up, but the remaining amounts of the yellow ink, magenta ink and the cyan ink are sufficient, and therefore, the color mode signal reception only is possible; a fourth mode in which the four inks are all used up; and a fifth mode covering the mode not falling in any of the above four mode. The apparatus A discriminates which mode is to be selected.

In this embodiment, the description will be made as to the case wherein the first mode signal is received. In this case, the apparatus A confirms again as to whether the color mode is selected by the key 240 (S77). If so (color mode), the signal read at step S3 is transmitted to the apparatus B to execute the recording operation in the apparatus B (S79). Then, if it is discriminated at step S81 that one of the color ink material in the apparatus B is used up during the recording operation of the apparatus B, the step S85 is executed. If the color inks are sufficient until the completion of the recording operation, the step S79 is executed in which the recording operation is performed.

Figure 7:
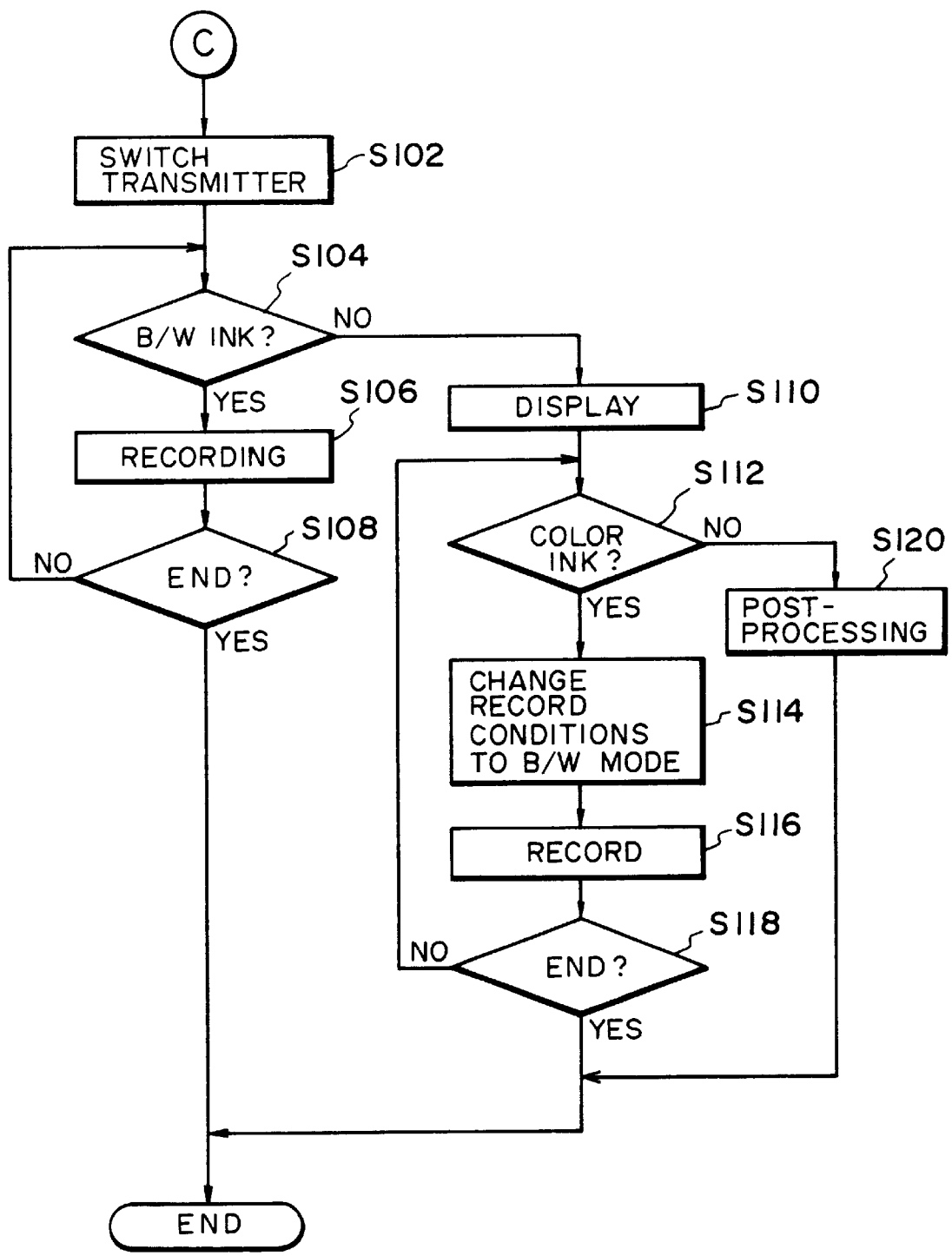

If the mode set at step S77 is a monochromatic mode, the operation proceeds to (c) in FIG. 7.

If the operation proceeds from step S81 to step S85 during the color image recording operation, the display 242 indicative of the black and white mode in the apparatus A is flickered. The flickering display notifies the operator of the apparatus A of the disabled communication in the color mode.

Then, that is, after the flickering display, the discrimination is made at step S92 as to whether or not the black and white mode is selected by the key 240, and if so, the display 242 indicative of the black and white mode is actuated at step S94.

The switching to the black and white mode may be carried out automatically without the necessity of the key 240 actuation.

If it is discriminated at step S81 that a signal indicative of the lack of the color ink is transmitted from the apparatus B, the step S92 may be omitted, so that the step S94 and the subsequent steps may be automatically executed.

Then, the instructions are produced for driving only the black ink head of the apparatus B (S96) to carry out the black and white recording. By this, the recording operation at the receiving station (apparatus B) can be performed, and the received image can be seen.

In the black and white recording, the information transmitted from the apparatus A to the apparatus B can be converted from the color image data to the monochromatic image data.

This can be effected by combining the color data signals R, G and B, as described hereinbefore, that is, Y=0.3R+0.6G+0.1B, for example, by which the amount of data transmitted reduced.

It is a possible alternative that the information data transmitted is not changed from the color data to the monochromatic data at step S96, but the color image data, for example, R, G, B data are transmitted, and the instruction signal indicative of executing the black and white recording is transmitted.

Steps S98 and S99 are similar to the steps S69 and S72, respectively, except for the following. In the step S69, the discrimination is made as to whether or not the color ink such as the yellow, magenta or cyan ink is present, but at step S98, the discrimination is made as to whether the black ink is present or not.

At step S100, similarly to the step S70, the no-ink is displayed. The display is simply to indicates the lack of the black ink.

Referring back to the above-described step S92, if the mode is not switched to the black and white mode, the operation proceeds to step S93 where the information sending and receiving operations are stopped.

If the color processing is not selected at step S61, the operation proceeds to step S62 where the black and white recording processing is performed, and the sequential operation ends.

The black and white recording operation is similar to the operation described in conjunction with steps S96–S100, and therefore the detailed description thereof are omitted for simplicity.

In this embodiment, the discrimination is made at step S61 as to whether or not the color processing mode is selected, before the discrimination is made at step S65 as to whether or not the local mode is selected. Therefore, in this embodiment, the local mode can not be selected unless after the color processing mode is once selected.

This is done in order to put priority on the color processing in the local mode.

However, the operations in the steps S61–S62 and the operations in the step S65 may be exchanged, so that the local mode selection is discriminated before the color-processing/black-and-white-processing is discriminated.

As described in the foregoing, according to this embodiment, even if the information receiving station located at such a position that the operator (sender) can not watch the receiving station, such as a remote recording station, the lack of the color ink in the receiving station can be notified of to the operator (sender). In addition, in accordance with the instruction of the operator, the subsequent recording operation can be switched to the black and white mode without stopping the recording operation, in the remote information recording operation.

In this embodiment, when such a trouble as described above occurs, the operator can call a person around the remote receiving station by the hand set 105.

The telephone communication may be made through a public line or through the above-described cable provided in the apparatus. The present invention is applicable to any of the above cases.

In the foregoing, the description has been made as to the case where the color ink or color inks becomes short during the color mode transmission.

Next, the description will be made as to the case where the black ink becomes short during the monochromatic mode communication, for example, the black and white mode communication, referring to FIG. 7.

The flow chart beginning with (c) is connected with (c) of FIG. 6. In this case, the selection is made to the monochromatic color mode, for example, the black and white mode. If the black ink becomes short during the recording operation in the black and white mode, and if the sensor 310 of the apparatus B detects the short of the black ink, the apparatus A performs predetermined process steps to notify the operator of the "no-ink" at step 110. If it is discriminated that the apparatus B contains a color ink material or ink materials at step S112, the recording instructions are transmitted to the driver of the apparatus B (S114) to continue the recording operation with the cyan ink, the magenta ink and/or the yellow ink (S116).

The percentages of the cyan ink, the magenta ink and the yellow ink may be properly determined in accordance with the recording properties. They may be changed properly in accordance with the recording conditions of the recording heads. It may be determined whether the operational change is effected during the recording operation or whether it is effected after the current recording cycle is completed, taking the remaining levels of the ink into account.

At step S112, if there is no color ink, the recording operation is stopped (S120). When the black-and-white mode is selected in the operating station 101 of the apparatus A, the display in the operating station 101 indicative of the black and white mode is changed to the other display mode, for example, from the on-state to the flickering state, in order to notify the operator of the above-described operation being performed.

FIG. 6-2 is a flow chart illustrating the operation of the receiving station in the local mode. When the local mode information receiving operation is selected in FIG. 6-2, the operation proceeds from step S120 to step S122, and the subsequent steps are different depending on whether the sending mode set in the sender is color mode or monochromatic mode. If it is the color mode, the color printing operation is carried out in accordance with the image data received (S124), and further, the discrimination is made at step S126 as to whether all of the color ink materials such as the yellow ink, magenta ink and the cyan ink are sufficient. If so, the discrimination is made as to whether the information reception is completed or not (S128), and if not, the step S124 is executed. If the ink is short, the operation proceeds from step S126 to S130 where the incapability of the color printing is notified to the sending station.

In the monochromatic mode, the operation proceeds from the step S122 to the steps S132–S138. The steps S132–S138 are similar to the steps S124–S130, but at step S126, the discrimination is made as to the remaining amounts of all of the color ink material, and at step S130, the result of discrimination is notified, whereas at step S134, the remaining amount of the black ink is detected, and the result is notified at step S138.

In this embodiment, the remaining amount of the ink (recording material) is detected at proper intervals during the communicating operation, and therefore, even if the ink is used up during the communicating operation, the proper measure can be taken.

In the flow chart of FIG. 6, if the color ink is used up at step S81, the mode is switched to the black and white recording mode. In place of the step S85, a step for receiving the signals by the memory 360 may be used. By doing so, even if the color ink is used up, the color recording is possible afterwards.

Figure 8:
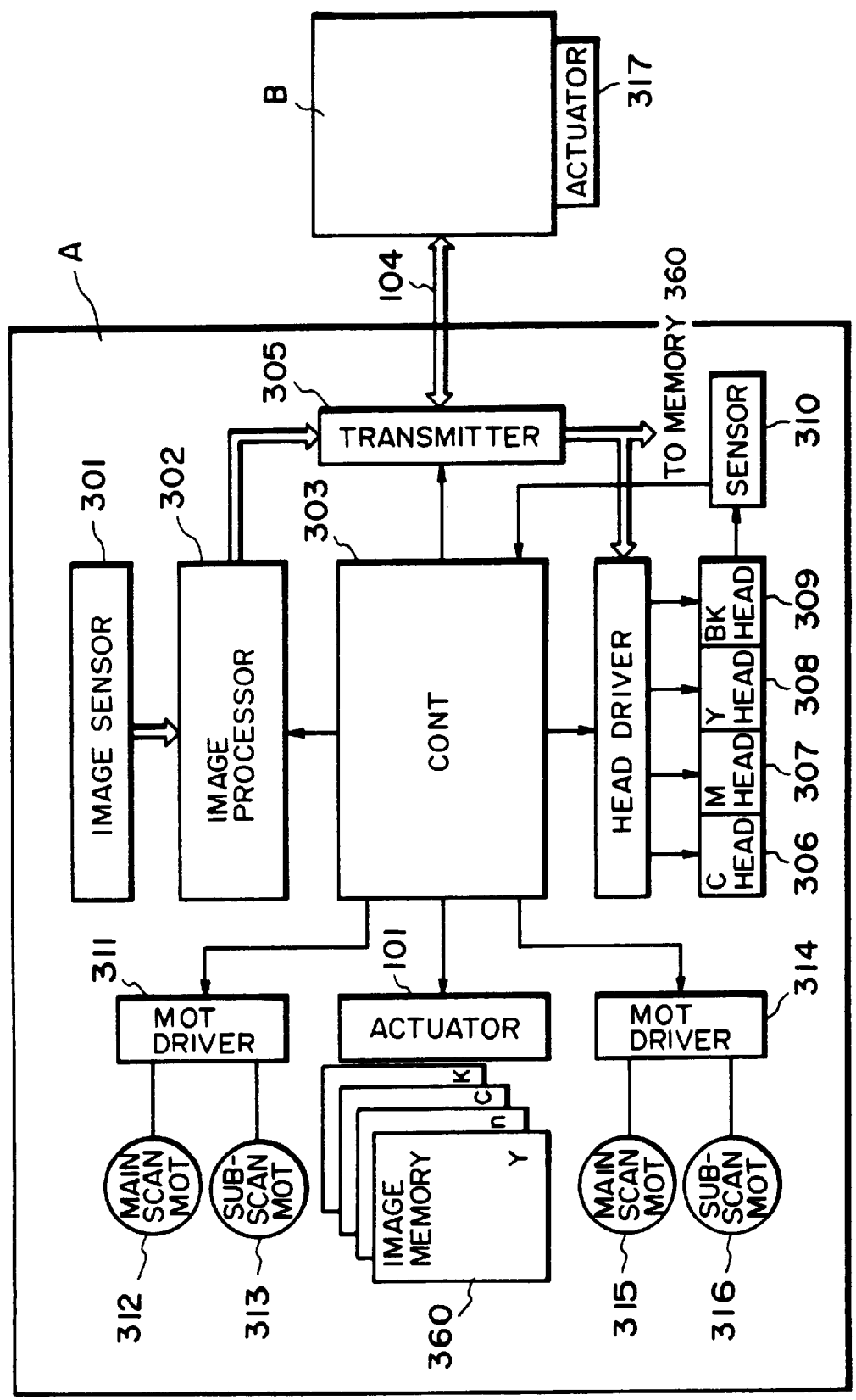
FIG. 8 is a block diagram in the apparatus according to another embodiment of the present invention.

FIG. 8 shows an embodiment wherein the memory means 360 includes memory having a capacity of plural pages information for each of the yellow, magenta and cyan and black colors.

In the foregoing description of the embodiments, the recording means is in the form of an ink jet recording device, but the present invention is not limited to this, and is applicable to various other devices, such as a thermal recording device, an electrophotographic device or the like.

While the invention has been described with reference to the structures disclosed herein, it is not confined to the details set forth and this application is intended to cover such modifications or changes as may come within the purposes of the improvements or the scope of the following claims.

What is claimed is:

1. An image recording apparatus comprising:

means for receiving image data;

means for depositing a plurality of colorants in accordance with the image data received by said receiving means;

means for detecting a remaining condition by determining whether at least one of remaining amounts of said plurality of colorants is less than a predetermined value or not; and means for retaining, for later use, said image data received by said receiving means when the remaining condition detected by said detecting means indicates that a remaining amount of at least one of the colorants is below a predetermined level.

2. An apparatus according to claim 1 wherein said plurality of colorants includes yellow, magenta and cyan colorants.

3. An apparatus according to claim 1, wherein said image data includes data for a plurality of color components.

4. An apparatus according to claim 3, wherein said retaining means retains the data for the plurality of color components.

5. An apparatus according to claim 1, wherein said detecting means detects independently a remaining condition of said depositing means for each of said plurality of colorants.

6. An image receiving apparatus comprising:

means for receiving image data;

means for depositing an ink on a medium in accordance with the image data received by said receiving means;

means for detecting a remaining condition by determining whether a remaining amount of the ink is less than a predetermined value or not; and means for retaining, for later use, said image data received by said receiving means when the remaining condition detected by said detecting means indicates that a remaining amount of at least one of the colorants is below a predetermined level.

7. An apparatus according to claim 6, wherein said image data includes data for a plurality of color components.

8. An apparatus according to claim 7, wherein said retaining means retains the data for the plurality of color components.

* * * * *

UNITED STATES PATENT AND TRADEMARK OFFICE
CERTIFICATE OF CORRECTION

PATENT NO.   : 6,084,554
DATED        : July 4, 2000
INVENTOR(S)  : Masayuki Hirose et al.

It is certified that error appears in the above-identified patent and that said Letters Patent is hereby corrected as shown below:

Title page,
Item [73], Assignee, [*] Notice, insert:
-- [*] Notice: This patent issued on a continued
   prosecution application filed under 37 CFR
   1.53 (d), and is subject to the twenty year
   patent term provisions of 35 U.S.C.
   154 (a) (2) --.
Item [56], References Cited, FOREIGN PATENT DOCUMENTS, "63194475" should read -- 63-194475 --.

Column 1,
Line 24, "the" (second occurrence) should read -- in the --.
Line 25, "informaton" should read -- information --.
Line 38, "short" should read -- shortage --.

Column 3,
Line 27, "displays the" should read -- display the --.
Line 39, "short" should read -- shortage --.
Line 50, "transmits" should read -- transmit --.

Column 4,
Line 42, "rally" should read -- llary --.
Line 58, "1," should read -- $\ell$, --.

Column 8,
Line 3, "signals" should read -- signals is discriminated --.
Line 64, "reduced." should read -- is reduced. --.

Column 9,
Line 24, "are" should read -- is --.
Line 30, "unless" should read -- until --.

UNITED STATES PATENT AND TRADEMARK OFFICE
CERTIFICATE OF CORRECTION

PATENT NO. : 6,084,554
DATED : July 4, 2000
INVENTOR(S) : Masayuki Hirose et al.

It is certified that error appears in the above-identified patent and that said Letters Patent is hereby corrected as shown below:

<u>Column 10,</u>
Line 2, "short" should read -- shortage --.

Signed and Sealed this

Second Day of July, 2002

Attest:

Attesting Officer

JAMES E. ROGAN
*Director of the United States Patent and Trademark Office*